United States Patent [19]

Stauder

[11] Patent Number: 5,678,753
[45] Date of Patent: Oct. 21, 1997

[54] WELDING FOR SPHEROIDAL GRAPHIC CAST IRON MATERIAL

[75] Inventor: François Stauder, Joinville, France

[73] Assignee: Ferry-Capitain (Sarl), Joinville, France

[21] Appl. No.: 568,836

[22] Filed: Dec. 7, 1995

[30] Foreign Application Priority Data

Dec. 9, 1994 [FR] France ................................ 94 14835

[51] Int. Cl.⁶ .................................................. B23K 9/235
[52] U.S. Cl. ...................... 228/225; 228/232; 228/262.4; 219/137 R
[58] Field of Search ........................... 228/262.4, 262.41, 228/226, 225, 232; 219/76.14, 145.23, 137 R

[56] References Cited

U.S. PATENT DOCUMENTS

| | | | |
|---|---|---|---|
| 2,444,654 | 7/1948 | Kihlgren | 148/24 X |
| 2,499,827 | 3/1950 | Kihlgren | 148/24 X |
| 3,196,537 | 7/1965 | Groman et al. | 228/262.4 X |
| 3,778,588 | 12/1973 | Bishel | 219/146 |
| 4,817,859 | 4/1989 | Bretenmoser | 228/226 |

FOREIGN PATENT DOCUMENTS 13323   7/1980   European Pat. Off. .

*Primary Examiner*—Kenneth J. Ramsey
*Attorney, Agent, or Firm*—Oblon, Spivak, McClelland, Maier & Neustadt, P.C.

[57] ABSTRACT

The invention relates to the welding of cast-iron castings.

The process for the fusion welding of spheroidal-graphite cast-iron castings comprises the following steps:

a) a preheat at a temperature of between 230° and 300° C. is carried out before buttering the zone of the casting to be welded;

b) a heat treatment at a temperature of between 800° and 920° C. is applied to the buttering for a suitable period and then a cooling cycle is carried out;

c) again, a preheat of the buttering is carried out at a temperature of between 130° and 200° C. and followed by a finish weld.

Application to the repair of cast-iron castings and to the joining of cast-iron castings together or to steel castings.

8 Claims, No Drawings

WELDING FOR SPHEROIDAL GRAPHIC CAST IRON MATERIAL

The present invention relates to the welding of grey cast-iron castings, and more particularly to a process for welding spheroidal-graphite cast irons or nodular cast irons, under moderate preheating conditions.

The welding of cast irons is a tricky and difficult operation to carry out, especially because of its inability to withstand the stresses resulting from the heat cycles in conventional welding methods. In addition, the known methods produce welded joints whose mechanical and aesthetic properties are not always satisfactory, which limits the possibility of using them in repair processes and in processes for joining castings (all-welding assembly).

Methods of welding by means of iron-based electrodes are known but to use them requires localized preheating to a temperature above 600° C., something which is difficult to achieve, or even impossible in the case of heavy castings.

Welding with an electrode, whatever its type, consists in depositing a molten metal on the base cast iron. This cast iron, exposed to the welding arc and in contact with the molten metal, undergoes surface remelting to a shallow depth (approximately 0.1 to 3 mm). The cooling rate increases as the welded thickness increases and may be of the order of 800° C./s in a temperature range between 1200° C. and 800° C. in the case of a weld bead deposited on a casting of approximately 50 mm in thickness. Because of this cooling rate and the chemical composition of a eutectic cast iron, solidification cannot take place according to stable diagram and therefore, in this joint zone, a metallographic structure is obtained which is composed of extremely hard and brittle eutectic carbides which may lead to cracking during cooling.

This drawback may be limited by using a welding filler metal rich in nickel in order to limit the amount of iron carbide formed during solidification, as described in Patent FR-A-2,359,680 for example. In all cases, it is necessary to heat treat the weld at a temperature of the order of 800° to 850° C.

Moreover, the metal part subjacent to the joint zone (called "heat-affected zone") remains in the solid state during welding but its cooling is similar to that of the joint zone and may lead to undesirable metallurgical transformations, for example the formation of a hardening structure. In order to avoid this problem, it is absolutely essential to preheat the zone to be welded to a temperature above 200° C. (T° C. Ms, the Martensite Start temperature).

Finally, with the known methods, it is difficult to avoid creating stresses in the weld/casting joint zone exceeding the yield stress of the ledeburite-type structure obtained and causing cracking. In order to limit this phenomenon, it is necessary to preheat the weld zone to a temperature of the order of 600° to 650° C.

In the known homogeneous high-temperature welding methods, involving an approximately 600° C. preheat, iron-cored electrodes with a graphitic basic coating, depositing a nodular cast iron, are used. According to another technique, described in Patent FR-A-2,407,786, welding is carried out using a steel electrode coated with a composition based on vanadium, silicon, barium carbonate, calcium fluoride and iron in powder form. These methods are generally difficult to employ, or indeed impossible in the case of heavy castings.

Heterogeneous cold welding methods using nickel-cored or ferronickel-cored electrodes are known, but these methods are slow, expensive and economically unacceptable, and they do not result in welded joints having satisfactory mechanical properties. It may only be considered for the attractive repair of small visible defects.

Finally, welding processes combining an influx of heat and the application of pressure have also been developed in order to try and avoid the formation of ledeburite, which is responsible for the brittleness of the weld, and, for example, Patent FR-A-2,455,944 describes such a process which requires the use of an intermediate composition placed between the castings to be welded, the weld zone being heated to a temperature of 800° to 1,000° C. under a pressure of 200 bar.

It is therefore extremely difficult to weld satisfactorily castings of grey cast iron, especially spheroidal-graphite cast iron, using the known methods mentioned hereinabove, most particularly in the case of heavy castings.

The subject of the present invention is a process for the semi-heterogeneous welding of grey cast irons, and in particular spheroidal-graphite cast irons.

The process according to the present invention is a process for the fusion welding of spheroidal-graphite cast-iron castings using the technique of buttering, which is essentially distinguished in that it comprises the following steps:

a) a preheat at a temperature of between 230° and 300° C. is carried out before buttering the zone of the casting to be welded;

b) during buttering, a heat treatment of between 800° and 920° C. is applied for a suitable period and then a cooling cycle is carried out;

c) again, a preheat of the buttering at a temperature of between 130° and 200° C. is carried out followed by finish welding (filling or joining).

According to a preferred embodiment, the welding carried out in step c) above is followed by a stress-relieving heat treatment at a temperature of between 530° and 570° C. for a suitable period of from one hour to a few hours.

The preheat in step a) above is carried out locally on the casting to be treated, in the region of the defect to be repaired or of the zone to be joined by welding, at a temperature of between 230° and 300° C., preferably at approximately 250° C. The preheat temperature may possibly exceed 300° C., but such a temperature has no advantage. On the other hand, it is important for this temperature to be above the Martensite Start temperature (T° C. Ms) inherent in the treated material, which is generally of the order of 200° C. The lower limit of the preheat temperature may therefore vary slightly depending on the Martensite Start temperature of the cast iron to be welded. A temperature below this limit would have the drawback of leading to the risk of cracking in the buttering zone and in the cast-iron/butter intermediate zone.

The buttering and welding operations of the above steps a) and c) may preferably be carried out by means of a steel-cored electrode coated with a semibasic composition,. for example by using a DC (80 to 110 A) arc welding unit, the electrode being connected to the positive pole. It may be advantageous to use a low-carbon mild steel electrode with a coating having a low content of carbonate and of fluorite compared to the more usual coatings, but containing approximately 10% by weight of silica. The electrode used for the finish welding (filling, in the case of a repair, or joining in the case of all-welding assembly) may be adapted depending on the results desired, in particular when a cast-iron casting and a steel casting are joined using the process of the invention.

The buttering is carried out according to the conventional techniques, in one or more layers, and preferably in two or three layers so as to obtain a total buttering thickness of between 3 and 15 mm, preferably 5 to 10 mm, in thickness. In the case of the repair of a cast-iron casting, the buttering is carried out on the zone to be repaired. In the case of joining two castings by all-welding assembly, the buttering is carried out on the zones to be joined, these preferably being bevelled beforehand.

The heat treatment applied during step b) above may be adapted, in accordance with the present invention, depending on the results desired.

Thus, when it is desired to obtain a welded joint having mechanical properties at least equal to those of the base cast iron, it is advantageous to maintain the temperature between 850° and 920° C. for a suitable period, for example 2 hours for a welded joint approximately 25 mm in thickness and approximately 4 hours for a casting 50 mm in thickness, and then carry out cooling in order to bring the temperature of the centre of the buttering down to between 250° and 300° C., avoiding any further temperature rise above this limit.

This treatment has the effect of destabilizing the undesirable iron carbides which may form in the joint zone between the buttering and the base cast iron. Such eutectic carbides are, in fact, brittle and very hard, and therefore difficult to machine, and could lead to cracking of this joint zone. In contrast, the heat treatment has the effect of promoting the formation, in this zone, of very fine nodules of the black-heart malleable cast-iron type, in high concentration within a ferritic matrix. It is important for the centre of the buttering to be brought down to below 300° C. in order to prevent graphitization of the pearlite formed by the quench.

The heat treatment is preferably applied to the entire casting, but it is possible to carry out a localized treatment.

It is most particularly advantageous to carry out the cooling by an air-blast quench, localized on the buttering, in order to bring its temperature down to approximately 250°–300° C. This treatment, localized on the buttering, produces a ferrito-pearlitic structure where the pearlite gives the entire welded joint the excellent mechanical properties desired.

On the other hand, if it is desired above all to obtain a completely leaktight welded joint resembling, on the outside, the base cast-iron casting as close as possible, it is then advantageous to carry out the heat treatment at a temperature of between 800° and 850° C. for a longer period than in the previous case, for example 4 hours for a welded joint thickness of 25 mm, 6 hours for 50 mm, and subsequently to allow it to cool down in the open air. In this case too, it is preferable to apply the heat treatment to the entire casting. However, a localized treatment is also possible, especially in the case of the joining of castings.

Contrary to the case of the treatment described hereinabove where a pearlitic structure is obtained in the buttering/cast-iron joint zone, in this case a more malleable ferritic zone is obtained.

In both cases, the heat treatment is carried out by using a standard apparatus, with a heating rate which may be approximately 50° to 100° C./hour. It is possible, for example, to use a furnace of the type commonly used in the metallurgical industry, or alternatively locally applied ceramic heating resistance elements.

Tests carried out on the welded joints produced in accordance with the invention have demonstrated excellent mechanical and micrographic properties. In particular, the mechanical properties of the welded joint are equivalent, and in some cases even superior, to those of the base cast iron, and this is achieved by relatively low preheat temperatures of the order of 250° C.

In addition, it may be pointed out that the tensile fracture exhibits no brittle character and the necking deformation observed in the melted zone, before fracture, is a reliable indication of the closeness to the ultimate tensile strength of the base metal. The tests carried out on the joints made by the process of the invention have shown that the Vickers hardness of the welded joints is less than 350, (HV 500, Vickers hardness under a load of 500 g), which confirms that they are completely machineable, contrary to the welded joints obtained by the conventional techniques.

The process in accordance with the present invention has many advantages. In particular, it may be employed without requiring the use of special equipment and it enables the field of application of spheroidal-graphite cast irons (SG cast irons) to be enlarged, not only in the field of repair, enabling castings to be repaired which hitherto would have been scrapped, but also in the field of the joining, by all-welding assembly, of cast-iron plates together or to alloy-steel or carbon-steel plates. In the field of repair, it now becomes possible to repair easily castings having defects arising from the casting operation or from solidification.

Non-limiting embodiments of the process of the invention are described below, for a repair of a casting using welding, an all-welding assembly of two SG cast-iron castings and an all-welding assembly of a SG cast-iron casting with a steel casting (alloy steel or carbon steel).

EXAMPLE 1

Repair of a 400-12 SG cast-iron casting.

The object of this example is to repair a casting by obtaining a welded joint having mechanical properties at least equal to those of the base cast iron.

The repair of a casting (400-12 SG cast iron) consisting of a 55 mm thick plate having a defect (sand inclusion) at a depth of 25 mm is started by carrying out mechanical excavation using grinding in order to form a crater.

The chemical composition of the cast iron used is as follows:

| C | Si | Mn | P | S | Ni | Cr | Mo | Cu |
| --- | --- | --- | --- | --- | --- | --- | --- | --- |
| 3.40 | 2.18 | 0.22 | 0.025 | 0.007 | 0.10 | 0.05 | 0.06 | 0.16 |

The cast-iron casting is heated locally to a temperature of approximately 250° C., in the region of the fault to be repaired, by means of gas torches.

Next, the buttering is carried out by using a 3.2 mm diameter metal-cored electrode, made of low-carbon mild steel with a semibasic coating, of commercially available type. The chemical composition of the electrode is as follows:

Next, the buttering is carried out by using a 3.2 mm diameter metal-cored electrode, made of low-carbon mild steel with a semibasic coating, of commercially available type. The chemical composition of the electrode is as follows:

| C | Mn | Si | Ni | Mo | V |
| --- | --- | --- | --- | --- | --- |
| 0.06 | 0.6 | 0.41 | 0.029 | 0.01 | 0.012 |
| S | P | Cu | Cr | Ti | Al |
| 0.007 | 0.016 | 0.011 | 0.024 | 0.013 | 0.001 |

The coating used has a low content of carbonate and of fluorite and constitutes a coating of the "lime/silica" type containing approximately 10% of silica. The fusion product of this coating is a slag having a glassy appearance.

The DC electrode is operated using a current of between 85 and 100 A and a voltage of 23 V, the local temperature of the casting to be treated being above 250° C. The buttering is carried out in three successive layers, resulting in a total thickness of approximately 6–7 mm. The edges of the crater are surrounded by a weld bead so as to protect the base cast iron from possible fusion during the subsequent filling operation.

After cooling down to room temperature in the open air, the buttering is inspected and, if necessary, the few defects which may appear are removed.

Next, the overall heat treatment of the entire casting is carried by progressively heating it to a temperature of 900° C. in a furnace, the rate of temperature rise being 50° C./h.

The casting is maintained at 900° C. for 2 hours (for a 25 mm thick welded joint) and it is then cooled using the technique of air-blast quenching, the air being directed onto the buttering, so as to bring the temperature in the centre of the buttering down to approximately 250°–300° C.

The surface of the buttering, after the above heat treatment, is mechanically treated by grinding so as to remove the iron oxide formed on the surface, and then, after inspecting the buttering, the zone to be treated is preheated to a temperature of approximately 150° C. The finish welding (filling) is then carried out using an electrode identical to that described. hereinabove, the strength of the current being 95–110 A.

Finally, a stress-relieving heat treatment is carried out so as to remove any residual stresses in the vicinity of the weld, by progressively heating to a temperature of approximately 550° C., with a rate of temperature rise of the order of 50° C./h. The temperature is maintained for a period of approximately 2 hours (for a welded thickness of 25 mm) and then left to cool in the open air.

The mechanical properties of the welded joint obtained are indicated in the table below.

Tensile Strength

The tests were carried out on 10 mm diameter test specimens

| Specimen | Tensile strength (MPa) | Yield stress (MPa) | A % | Z % |
| --- | --- | --- | --- | --- |
| 1 | 486 | 394 | 26.4 | 72.9 |
| 2 | 503 | 424 | 22.6 | 71.9 |
| 3 | 490 | 431 | 24.2 | 75.0 |
| 4 | 494 | 425 | 21.2 | 70.8 |

A%=Elongation
Z%=Necking (reduction in cross-section).

It was possible to observe that the fracture is localized within the melted zone.

Bending Test

The tests were carried out on 10×20×180 mm specimens

| Ram (diameter in mm) | Fracture stress (MPa) | Bending angle (°) |
| --- | --- | --- |
| 40 | 72 | 49 |

The tests showed that fracture in bending occurs within the joint zone.

EXAMPLE 2

Repair of a 400-12 SG cast-iron casting.

The object of this example is to repair a casting by producing a welded joint having excellent aesthetic characteristics, exhibiting an appearance identical to that of the base cast iron while at the same time providing a completely leaktight joint.

The procedure is as in Example 1, using a cast-iron casting of the same dimensions, having the same defect. After localized heating to 250° C., the buttering is carried out under the same conditions and using the same electrode as in Example 1, before carrying out the following heat treatment.

The casting is steadily heated to a temperature of approximately 820° C., the rate of temperature rise being approximately 50° C./h. The casting is maintained at this temperature for a period of approximately 4 hours (for a thickness of 25 mm) and then cooled in the open air.

After filling and a stress-relieving heat treatment as in Example 1, a welded joint is thus obtained whose appearance is very close to that of the base cast iron, without crack formation.

EXAMPLE 3

Joining of two 400-12 SG cast-iron castings.

Two 25 mm thick cast-iron plates, having the same composition as in the Example 1, are joined together (allwelding assembly).

The surfaces of the zones to be joined are bevelled by machining and the bevels are inspected using a liquid-penetration test.

The bevels are locally preheated to approximately 250° C., over their entire thickness, and, then buttering is carried out on each bevel by means of the same electrode as in Example 1, in three layers so as to obtain a total thickness of approximately 5 mm on each bevel. A weld bead is deposited at the boundary of the buttering in order to prevent any overflow which could lead to the base cast iron melting in the joint zone during the subsequent joining operation.

After cooling down to room temperature, a heat treatment of the buttering, identical to that in Example 1, is carried out followed by an air-blast quench until the temperature in the centre of the buttering has been brought down to approximately 250°–300° C.

After cooling, in order to inspect the buttering obtained, the zones to be joined are locally preheated to a temperature of approximately 150° C. The two cast-iron castings are then joined simply by welding, using the same electrode as above and under the same conditions as in Example 1, and then a stress-relieving heat treatment is carried out at approximately 550° C. for approximately 2 hours, as indicated above. Cooling is then carried out in the open air.

EXAMPLE 4

Joining a 400-12 SG cast-iron casting and a steel casting.

A cast-iron casting identical to that in Example 3 above is joined to an XC 38-type steel casting (carbon steel capable of undergoing heat treatment) having the same dimensions as the cast-iron sheet.

The cast-iron and steel castings are each bevelled in the zone to be joined and inspected using a liquid-penetration test.

The procedure is as indicated in Example 1, but the preheat and buttering are carried out only on the bevels of the SG cast-iron casting.

The electrode used for the buttering of the cast-iron casting is identical to that of Example 1. Next, this buttering is subjected to the same 900° C. or 820° C. heat treatment, depending on the result desired (priority is given to the mechanical properties or to the aesthetic characteristics of the welded joint).

The electrode used for the joining operation is identical to the above electrode, but it may be chosen depending on the type of steel to be joined to the cast-iron casting.

The final stress-relieving heat treatment is identical to that described in Example 1 above.

This procedure is repeated, replacing the XC 38 steel with a 35 NCD 6-type alloy steel (a steel alloy with nickel, chromium and molybdenum). The procedure is as above, but by replacing the electrode used for the joining operation with another electrode, commercially available, which has a composition similar to that of the alloy steel used.

The tests confirm the excellent results obtained.

What is claimed is:

1. Process for the fusion welding of spheroidal-graphite cast-iron castings using the technique of buttering, characterized in that it comprises the following steps:
    a) a preheat at a temperature of between 230° and 300° C. is carried out before buttering the zone of the casting to be welded;
    b) a heat treatment at a temperature of between 800° and 920° C. is applied to the buttering for a suitable period and then a cooling cycle is carried out;
    c) again, a preheat of the buttering is carried out at a temperature of between 130° and 200° C. and followed by a finish weld.

2. Process according to claim 1, characterized in that the welding carried out in step c) is followed by a stress-relieving heat treatment at a temperature of between 530° and 570° C. by a suitable period of from one to a few hours.

3. Process according to claim 2, characterized in that the total thickness of the buttering is between 3 and 15 mm.

4. Process according to claim 1, characterized in that the heat treatment in step b) is carried out at a temperature of between 850° and 920° C.

5. Process according to claim 4, characterized in that the heat treatment is followed by cooling in order to bring the temperature of the centre of the buttering down to between 250° and 300° C.

6. Process according to claim 5, characterized in that the cooling is carried out by air-blast quenching, localized on the buttering.

7. Process according to claim 1, characterized in that the heat treatment in step b) is carried out at a temperature of between 800° and 850° C.

8. Process according to any one of claims 1 to 3, characterized in that the buttering and the welding in steps a) and c) are carried out by means of a steel-cored electrode coated with a semibasic composition.

* * * * *

UNITED STATES PATENT AND TRADEMARK OFFICE
CERTIFICATE OF CORRECTION

PATENT NO. : 5,678,753
DATED : October 21, 1997
INVENTOR(S) : Francois STAUDER

It is certified that error appears in the above-identified patent and that said Letters Patent is hereby corrected as shown below:

On the title page, Item [54], the title should read:
-- WELDING FOR SPHEROIDAL GRAPHITE CAST IRON MATERIAL --

Column 1, the title should read--WELDING FOR SPHEROIDAL GRAPHITE CAST Iron MATERIAL--.

Signed and Sealed this

Twenty-third Day of December, 1997

Attest:

BRUCE LEHMAN

*Attesting Officer*  *Commissioner of Patents and Trademarks*